April 9, 1940.     C. KITLEY     2,196,311
BORING TOOL
Filed Nov. 14, 1939

INVENTOR.
CLYDE KITLEY
BY Earl E Moore
ATTORNEY

Patented Apr. 9, 1940

2,196,311

UNITED STATES PATENT OFFICE 2,196,311

BORING TOOL

Clyde Kitley, Bakersfield, Calif.

Application November 14, 1938, Serial No. 240,241

4 Claims. (Cl. 255—61)

This invention relates to a tool for boring holes in brittle and similar materials such as brick, cement, stone and the like. The invention has particular reference to a rotary type of drill which is adapted to be placed in an auger or brace which may be hand operated or machine operated. The drill has one end designed to fit and be held in the chuck of an auger or brace and the like, and another end configurated and shaped to rapidly cut its way through the material when rotated. It is provided with cutting and chipping edges and points and of a spread suitable to provide the particular size hole desired. The cutting and clipping edges and points are alined in a manner to efficiently cooperate to bore a clean and neat hole with a minimum of energy.

A plurality of cutting and/or chipping edges are provided and shaped so as not to grind its way through the material being bored, but rather to chip its way in a self feeding action. A bevelled cutting edge is taken advantage of, however, for keeping the hole clean as the chipping edges and/or points prick and make their way through the material. In order to effectively promote and to cause the continuation of the pricking action of the cutting edges, the tool is divided into a plurality of elongated and substantially parallel arms or prongs which are tempered and shaped to provide an elastic action. This elastic action and the general operation of the tool will be better understood when the specifications are read in connection with the accompanying drawing.

An object of this invention is to expose means and methods for boring a hole in siliceous, mineral and cementitious materials and the like.

Another object of this invention is to provide a boring tool having elastic properties for causing its cutting edges and points to prick and chip their way through the material being bored.

Another object is to provide a drill which is rotary in action and set to provide a clean hole in a minimum of time and power.

A still further object is the provision of a boring instrument having an elastic and vibratory rotary action capable of maintaining its cutting edges for a long period of time.

Other objects, advantages and features of my invention will appear from the accompanying drawing, the subjoined detailed description, the preamble of this specification and the appended claims.

Applicant is about to illustrate and describe one of the forms of his invention in order to teach one how to make, use and vend the same, but it is to be understood that the drawing and description thereof are not to limit the invention in any sense whatsoever, except as limited by the appended claims.

In the drawing:

Fig. 1 of the drawing shows the invention in plan view.

The preferred form of the invention shows the drill as having a shank 1 which may be round in cross section or of some other suitable configuration, and which is integral with a tapered head 2 designed to fit the socket or chuck of an auger and the like, not shown. Integral with the shank is a split drill end 3 which is preferably configurated as shown. These elements are preferably made of a high grade tool steel having the necessary strength and elasticity for the purposes intended. The grade and kind of material used for making the boring instrument or drill will depend largely upon the kind and type of material to be bored. The head of the drill may be threaded or otherwise treated where it is to be attached to long stems, tubes and the like when used for well drilling and test drilling in mining.

Figure 1:
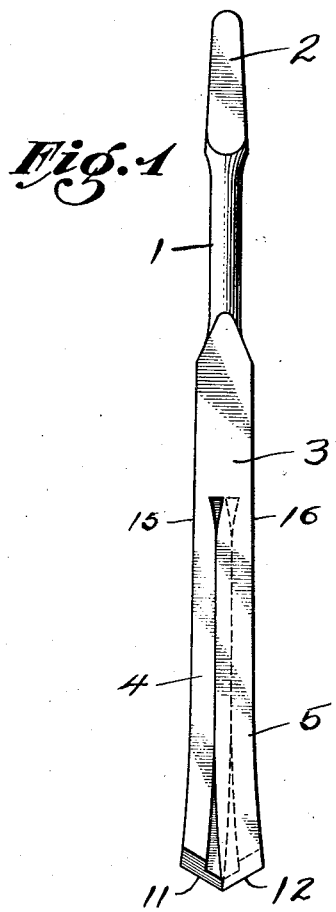
Figure 2:
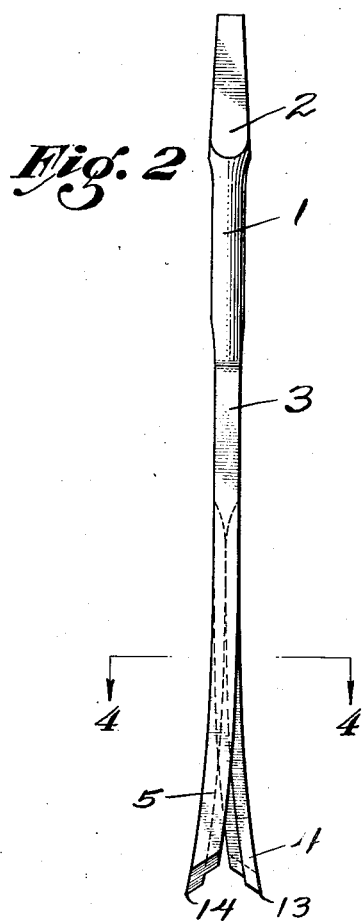
Fig. 2 shows a side view thereof.
Figure 3:
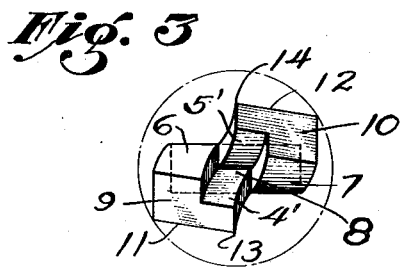
Fig. 3 shows an end view of the cutting end of the drill.
Figure 4:
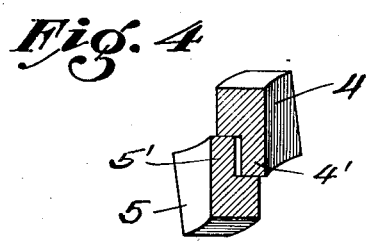
Fig. 4 shows a section taken substantially along the line 4—4 of Fig. 2.

The drill end 3 comprises two arms or prongs 4 and 5 which are formed with rabbets in the manner shown most clearly in Figs. 3 and 4, consisting of the laps 4' and 5'. These rabbeted arms run in juxtaposed parallelism along the major part of the lengths of the arms and extend to near their cutting ends. The cutting ends are swaged to form bent or curved portions 6 and 7 so as to form a gap 8 having divergent curved walls including the laps 4' and 5'. The extreme ends of the arms 4 and 5 are ground to form the bevelled surfaces 9 and 10 respectively to produce sharp keen edges 11 and 12 respectively. The grinding produces the pricking or chipping points 13 and 14 which are the leading cutters for the drill as it progresses through the material being bored. These points vibrate as the drill is rotated and break and chip away the material about the periphery of the hole to form an ever deepening ring. The edges 11 and 12 cooperate with the points and cut away the intermediate material between the periphery and the center of the area being drilled. While the drill is being rotated, the newly formed chips and cuttings are automatically fed from the hole due to the upward pressure of the newly formed chips at the bottom of the hole.

The edges 11 and 12 are preferably ground so as to cause one of the points 13 and 14 to slightly protrude beyond the other so they will materially aid in starting the drill in hard substances.

The edges on either side of the points 13 and 14 are slightly biased, as shown, so as to make the chippers 13 and 14 more effective in their action. As the chippers 13 and 14 dig into the material to be removed, their respective prongs will undergo a bending stress and spring slightly backward until points overcome the sheer stress of the material being cut, in which event points will spring forward and quickly chip away a small bit of the material. This action will continuously repeat itself with both points and cause a constant vibration of them and the arms 4 and 5. By continuously turning the drill, the chippers 13 and 14 will alternately dig and chip as pressure is applied to the drill during the rotary action. In order to prevent binding of the drill as the following upper sections of the arms 4 and 5 enter the hole as the chippers progress, the arms are tapered or biased along their outer edges 15 and 16 so that the widest part is at the cutting ends.

The rabbeted split along the body of the drill 3 performs a very important function and is indispensable toward making the instrument an effective driller. The split divides the drill into two halves having the overlapping parts 4' and 5' which support and brace one another while the arms 4 and 5 are under bending stresses. The rabbeted split prevents the halves from slipping past one another and then twisting around one another. The rabbet portion of the split also prevents the halves from crowding and thus wedging the drill in the hole. Because of the rabbets, the drill arms have a true reflexive action as their chipper points vibrate during the boring performance.

The bit of the tool is made long so as to allow plenty of material for resharping and dressing it. The bit can be swaged cold on the job where it is used and the chipper points spread to make the desired size hole. The sides of the bit may be filed so as to reduce its spread when it is required to make a hole having some particular diameter so as to fit a certain sized peg or plug.

In practice, it has been found that the bit is more effective in drilling very hard substances when the chipping points are spread far apart, whereas softer materials can be drilled better when the points are not spread very much. In either event, the side walls of the hole are cut clean and smooth so that no small particles will remain attached to the walls and tend to lubricate the movement of pegs and plugs wedged therein. It has been found that when small particles remain in the hole, inserted pegs do not become as tightly seated as when the walls of the hole are clean.

Having thus described and illustrated a preferred form of the invention, I claim the following:

1. A boring tool including a pair of strips fixed together at one of their ends and having their other ends free, said free ends being sprung apart in one direction and swaged apart in another direction, ground surfaces at said free ends forming cutting edges which converge toward one another forming chipping points substantially along an axial plane of the tool, the strips being provided along their adjacent sides with rabbets, and said rabbets being spaced apart at the free ends of the strips and abutting one another at their central portions.

2. A boring tool having a plurality of strips joined together at one of their ends and free at their other ends, a rabbet along the adjacent sides of each strip abutting each other along the central portions thereof, a bias cutting edge at the free end of each strip terminating into chipping points, said free ends having a portion thereof swaged apart and outwardly from the axis of the tool and also bent apart and outwardly at right angles to the swaged position.

3. In a boring tool having a plurality of blades with upper integral ends and free lower ends, cutting means at the extreme lower ends of the blades, opposed faces of said blades having rabbets, said lower ends being sprung and swaged at right angles to provide outwardly toed chipping points.

4. In a drilling device for making holes in stone, brick, concrete and similar materials, a pair of metal strips having one of their ends joined together to form an integral shank and the other ends being free to vibrate, a rabbet along the opposing faces of the strips having contact with one another at points removed from the free ends of the strips, a bias cutting edge at the free end of each strip terminating into chipping points, said free ends having the lower portion thereof bent apart, and also swaged apart in a direction at right angles to the bent direction.

CLYDE KITLEY.